US007062649B2

(12) United States Patent
Daniell et al.

(10) Patent No.: US 7,062,649 B2
(45) Date of Patent: Jun. 13, 2006

(54) SYSTEM AND METHOD FOR CATEGORIZING SECURITY PROFILE RULES WITHIN A COMPUTER SYSTEM

(75) Inventors: William T. Daniell, Marietta, GA (US); Brian K. Daigle, Marietta, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 930 days.

(21) Appl. No.: 09/760,236

(22) Filed: Jan. 12, 2001

(65) Prior Publication Data

US 2002/0095592 A1    Jul. 18, 2002

(51) Int. Cl.
- *H04L 9/00* (2006.01)
- *H04K 1/00* (2006.01)
- *G06F 17/00* (2006.01)
- *G06F 7/04* (2006.01)
- *G06F 17/30* (2006.01)

(52) U.S. Cl. ............ 713/165; 713/166; 713/167; 726/1; 726/27

(58) Field of Classification Search ........... 713/201, 713/200, 164, 166, 167, 165; 726/1, 27
See application file for complete search history.

(56) References Cited

U.S. PATENT DOCUMENTS

| | | | | |
|---|---|---|---|---|
| 5,720,033 | A * | 2/1998 | Deo ........................... | 713/200 |
| 5,796,403 | A | 8/1998 | Adams et al. ............... | 345/343 |
| 5,826,268 | A * | 10/1998 | Schaefer et al. ............... | 707/9 |
| 5,991,791 | A | 11/1999 | Siefert ......................... | 709/100 |
| 6,125,457 | A | 9/2000 | Crisan et al. .................. | 714/36 |
| 6,154,844 | A | 11/2000 | Touboul et al. ............. | 713/201 |
| 6,158,010 | A | 12/2000 | Moriconi et al. ............ | 713/201 |
| 6,249,868 | B1 * | 6/2001 | Sherman et al. ............ | 713/168 |
| 6,324,578 | B1 * | 11/2001 | Cox et al. ..................... | 709/223 |
| 6,339,826 | B1 * | 1/2002 | Hayes et al. ................. | 713/166 |
| 6,418,416 | B1 * | 7/2002 | Rosenberg et al. .......... | 705/28 |
| 6,510,466 | B1 * | 1/2003 | Cox et al. ..................... | 709/229 |
| 6,587,836 | B1 * | 7/2003 | Ahlberg et al. .............. | 705/26 |
| 6,587,876 | B1 * | 7/2003 | Mahon et al. ............... | 709/223 |
| 6,721,890 | B1 * | 4/2004 | Shrikhande ................. | 713/201 |
| 6,789,112 | B1 * | 9/2004 | Freeman et al. ............ | 709/223 |

* cited by examiner

*Primary Examiner*—Ayaz Sheikh
*Assistant Examiner*—Christian LaForgia (57) ABSTRACT

A system for simplifying selection of security profile rules within a computer system utilizes a display device and a security application. The security application defines a list of security rules for locking down resources of a computer system and categorizes these rules into a plurality of categories. The security application displays at least one of these categories on a screen of the display device. When a user selects one of the categories, the security application determines which of the security rules are associated with the selected category and displays each of these associated security rules. The user then may enable ones of the displayed rule, and the security application, in response to an activation request, causes the computer system to enforce the enabled rules by modifying a machine state of the computer system.

19 Claims, 7 Drawing Sheets

FIG. 1

(Prior Art)

SYSTEM AND METHOD FOR CATEGORIZING SECURITY PROFILE RULES WITHIN A COMPUTER SYSTEM

BACKGROUND OF THE INVENTION

1. Field of the Invention

The present invention generally relates to computer resource security and, in particular, to a system and method for simplifying selection of security profile rules within a computer system by displaying a categorized list of the security rules.

2. Related Art

To protect a computer system against vulnerabilities (e.g., attacks from hackers), the computer system is often "locked down" via a security application. As known in the art, a security application locks down a computer system by controlling a machine state or configuration of the computer system such that the computer system (e.g., an operating system within the computer system) enforces a set of security rules that prevent unauthorized users from accessing and/or modifying certain applications, files, and/or other resources within the computer system. For example, a security application may set the configuration of the computer system such that the computer system enforces a rule that restricts which users may access a particular file. In this regard, the computer system may maintain a list, commonly referred to as an access control list, that identifies which users are authorized to access and/or use various computer resources. To cause the computer system to enforce the foregoing rule, the security application modifies the access control list such that it indicates which users may access the particular file. When a user attempts to access this file, the computer system first checks the access control list to determine whether or not the user is one of the specified users that may access the file. If the user is one of the specified users, then the computer system allows the access to occur. However, if the user is not one of the specified users, then the computer system prevents the access and displays a message to the user indicating that access to the requested file has been denied.

The security application normally includes data that defines a list of security rules that may be enforced by a computer system. The security application displays this list of security rules and allows a particular user or set of users, referred to herein as the "system administrator," to select which of the rules that the system administrator would like enforced by the computer system. The security application, in turn, modifies the configuration or, in other words, the machine state of the computer system such that the computer system enforces the rules selected by the system administrator.

Note that the security application normally sets the configuration of the computer system, and the computer's operating system enforces the selected security rules based on the settings controlled by the security application. In other words, the security application causes the operating system to enforce the selected rules by manipulating the configuration of the computer system. Thus, once the security application has set the configuration of the computer system, as described above, the security application usually provides no further functionality in enforcing the selected rules. The security application may, however, change the computer system's settings in order to change which rules are enforced by the operating system in response to inputs for changing the security profile from the system administrator.

As described above, the system administrator selects which security rules should be enforced based on the level of security desired by the administrator, and the degree to which the computer system is locked down by the security application depends on the rules selected by the system administrator. Generally, the more rules that are enforced, the more secure the system becomes and, in other words, the more the system is locked down. Thus, if the system administrator desires to have a more secure computer system, the system administrator typically selects more rules for enforcement and/or selects particular rules that provide a particularly secure environment in an area of interest to the system administrator. However, in general, the compatibility of the computer system decreases as the security of the computer system increases. Therefore, if security is not a high priority to the system administrator, then he or she may select for enforcement fewer rules and/or rules that do not provide a high level of security, thereby reducing the degree to which the computer system is locked down.

Moreover, the degree to which the computer system is locked down by the security application depends on the competing interests of system security and system compatibility. Therefore, the rules selected for enforcement usually vary from computer system to computer system based on the desires of the system administrators in establishing the security profile of each of the computer systems. As used herein, a "security profile" refers to the collective set of rules that have been selected for locking down a computer system in order to prevent unauthorized users from accessing and/or modifying certain resources within the computer system. Security applications that set the configuration of the computer system to induce the computer system to enforce the selected security rules or that, in other words, set the security profiles of computer systems are well known in the art and are often referred to as "lock down products" or "lock down applications." Normally, a security application only allows the system administrator or a user designated by the system administrator to change the computer system's security profile.

Since the security profiles of computer systems typically vary from computer system to computer system, most security applications do not provide a standard set of security rules for implementation. In this regard, most security applications list for the system administrator each security rule that may be selected for enforcement. The system administrator then reviews the displayed list of rules and selects the rules that the administrator would like enforced by the computer system and, in other words, added to the security profile of the computer system.

Unfortunately, as the need for more secure systems has increased, the list of security rules from which a system administrator may select in defining a computer system's security profile has increased as well. Thus, the process of selecting which rules should be included in the computer system's security profile can be a tedious and time consuming process. Furthermore, if the system administrator is not familiar with the ramifications of selecting many of the rules, then it can be difficult for the system administrator to select the appropriate set of rules that provides the computer system with the desired level of security.

Indeed, the system administrator after selecting and implementing a particular security profile often changes which rules are included in the security profile. Such changes may have been necessitated by the system administrator's inability to initially define the desired level of security or may have been necessitated by changing security needs. In changing the computer system's security profile, the administrator may make mistakes. In this regard, the system administrator, due to human error or due to the administrator's lack of understanding the ramifications of the changes, may mistakenly add undesirable rules and/or remove desirable rules, thereby changing the security profile in an undesirable way.

Attempting to discover and remedy the undesirable effects introduced by the system administrator in changing the security profile can be difficult and/or time consuming. In this regard, the system administrator typically traverses through the list of selected and/or unselected rules in order to determine why the security application is not behaving as intended. However, understanding the ramifications of whether or not particular rules are selected is paramount in such a debugging process, and not all system administrators are familiar enough with the security application in order to make well informed decisions in debugging and/or changing the security profile. Further, in some situations, it is possible that the errors introduced by changing the security profile lock authorized users and even the system administrator out of the computer system and/or the security application, thereby making the process of correcting for the administrator's mistakes even more difficult and problematic.

Thus, a heretofore unaddressed need exists in the industry for providing a system and method for simplifying selection of security profile rules within a computer system.

SUMMARY OF THE INVENTION

The present invention overcomes the inadequacies and deficiencies of the prior art as discussed hereinbefore. Generally, the present invention provides a system and method for simplifying selection of security profile rules within a computer system by displaying a categorized list of the security rules.

In architecture, the system of the present invention utilizes a display device and a security application. The security application defines a list of security rules for locking down resources of a computer system and categorizes these rules into a plurality of categories. The security application displays at least one of these categories on a screen of the display device. When a user selects one of the categories, the security application determines which of the security rules are associated with the selected category and displays each of these associated security rules. The user then may enable ones of the displayed rule, and the security application, in response to an activation request, causes the computer system to enforce the enabled rules by modifying a machine state of the computer system.

In accordance with another feature of the present invention, the various computer applications are stored in the memory of the computer system. The security application determines which computer applications are stored in the memory and displays the categories based on which computer applications are determined to be stored in the memory.

The present invention can also be viewed as providing a method for locking down resources of computer systems. The method can be broadly conceptualized by the following steps: defining a list of security rules for locking down resources of a computer system; categorizing the rules into a plurality of categories; displaying at least one of the categories; determining, in response to a selection of the one category, which of the rules is associated with the one category; displaying each of the rules determined in the determining step to be associated with the one category; enabling ones of the rules displayed via said displaying each of the rules step; and enforcing each of the enabled rules based on the enabling step.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
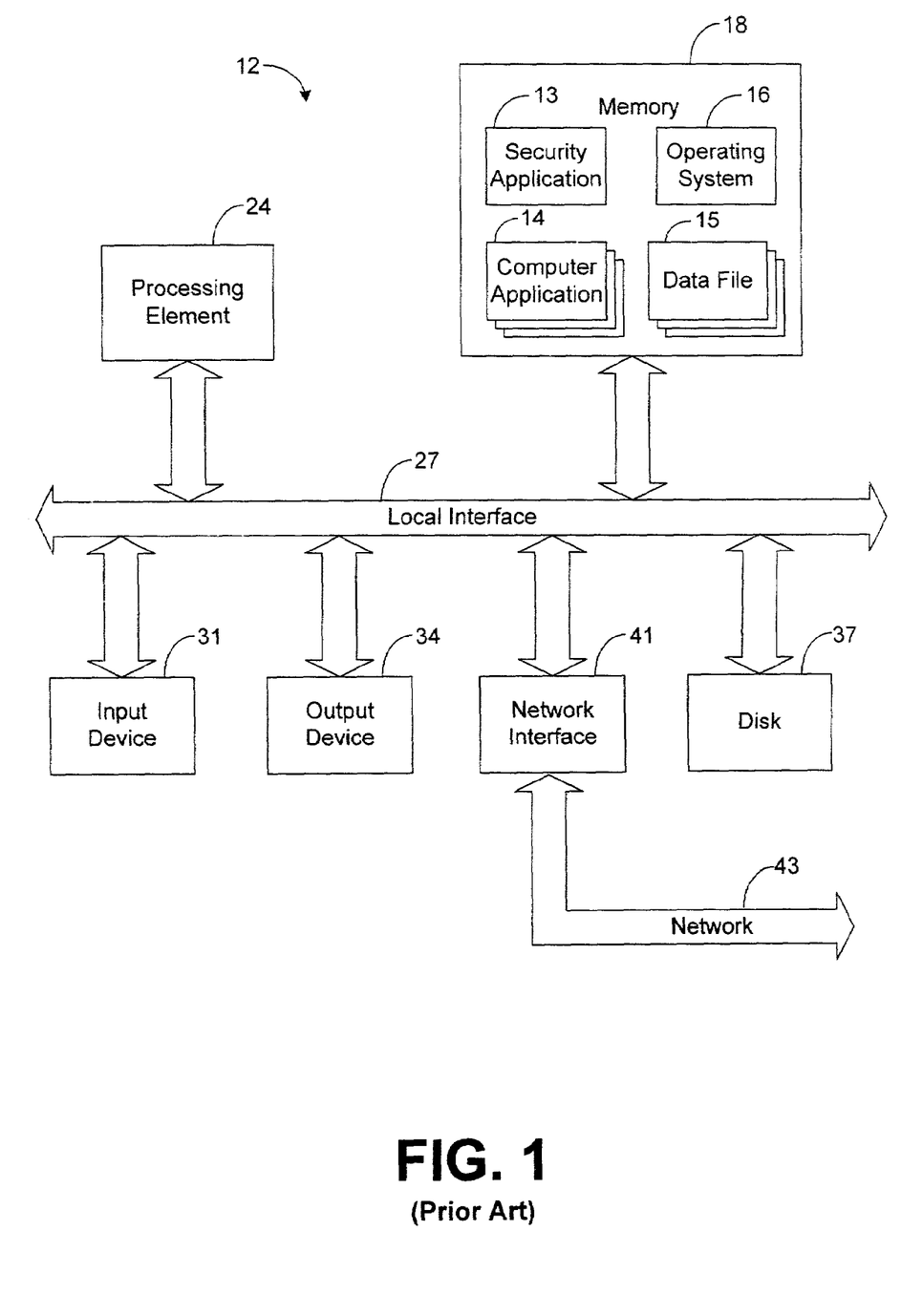
FIG. 1 is a block diagram illustrating a computer system employing a conventional security application.

FIG. 1 depicts a computer system 12 that employs a security application 13 of the prior art. The computer system 12 includes various computer applications 14, data files 15, and an operating system 16 stored in memory 18. The computer applications 14 may comprise any known computer applications for performing any programmed functionality when executed by the computer system 12. Windows NT, Microsoft Outlook, and Microsoft BackOffice are all examples of conventional computer applications that may comprise the computer applications 14 shown by FIG. 1. The operating system 16, via well-known techniques, is configured to control the operation and resources of the computer system 12. A primary function of the operating system 16 is to control when the instructions of applications 13 and 14 are executed by controlling when these instructions are interfaced with a processing element 24, such as a digital signal processor (DSP) or a central processing unit (CPU), for example.

Through well-known techniques, the processing element 24 is configured to execute the instructions transmitted to it. In executing these commands, the processing element 24 may communicate to and drive the other elements within the system 12 via a local interface 27, which can include one or more buses. Furthermore, an input device 31, for example, a keyboard or a mouse, can be used to input data from a user of the system 12, and an output device 34, such as a screen display or a printer, can be used to output data to the user. A disk storage mechanism 37 can be connected to the local interface 27 to transfer data to and from a nonvolatile disk (e.g., magnetic, optical, etc.). The system 12 can be connected to a network interface 41 that allows the system 12 to exchange data with a network 43.

The security application 13 includes data that defines a list of security rules for preventing unauthorized access and/or modification of certain applications 14, files 15, and/or other resources within the computer system 12. In other words, the security application 13 includes data that defines a list of security rules for locking down the computer system 12. For example, one of the rules, when enforced, may prevent a certain class of user from accessing a particular application 14. Other examples of rules typically included in lists defined by conventional security applications 13 for locking down a computer system 12 are well-known in the art and will not be described in detail herein.

When invoked for the first time, the security application 13 normally provides a list of options, via output device 34, to the user of the system 12. This user is normally considered to be a system administrator (i.e., a user authorized to set and/or change the security profile of the system 12). One of the displayed options is to enable selection of a new security profile to be implemented by the security application 13. Upon selection of this option, the security application 13 is configured to display to the system administrator, via output device 34, a list of the security rules defined by the data within the security application 13. The system administrator may analyze these rules and select the rules that he or she would like to have enforced Note that one of the rules usually selected is to allow only a certain class of user to modify the security profile. Therefore, only the system administrator and/or users designated by the system administrator may normally make changes to the selected security profile once the security profile is activated.

After each desired rule has been selected, the system administrator preferably inputs, via input device 31, a request for activating the selected profile or, in other words, for enforcing the rules selected by the user. Upon receiving this input, the security application 13 changes the configuration of the computer system 12 such that the computer system 12 begins enforcing the selected rules. In other words, the security profile selected by the system administrator is activated.

More specifically, the security application 13, in response to the activation request, is configured to change the machine state of the computer system 12 such that the selected rules are enforced by the operating system 16 during operation of the system 12. As known in the art, the machine state of a computer system 12 refers to mathematical values stored within the computer system 12 that indicate the computer system's current status. As an example, the machine state includes, but is not limited to, the values of the computer system's flags, registers, and counters. Some of the values of the machine state pertain to and control security within the computer system 12.

For example, one of the registers (not shown) within the computer system 12 may include a value or a flag indicative of whether any access restrictions to a particular application 14 or file 15 exist. When the system administrator has selected, via security application 13, a rule for restricting access to this particular application 14 or file 15, the security application 13, upon activation, changes the foregoing value within the register such that the value indicates that access to the particular application 14 or file 15 has been restricted. The security application 13 may also store in the register or other location data indicative of which users are authorized to access the application 14 or file 15 or indicative of which users are restricted from accessing the application 14 or file 15.

Before invoking or retrieving the particular application 14 or file 15, the operating system 16 analyzes the foregoing register to determine whether or not to access the particular application 14 or file 15. If the register indicates that access is not restricted, then the operating system 16 invokes or retrieves the application 14 or file 15. However, if the register indicates that access is restricted, then the operating system 16 takes further steps to determine whether or not the requesting user is authorized to access the application 14 or file 15. More specifically, the operating system 16 analyzes the data previously stored by the security application 13 that indicates which users are authorized to access or prevented from accessing the particular application 14 or file 15, and based on this data, the operating system 16 either accesses or refrains from accessing the particular application 14 or file 15.

Note that in the foregoing example, the security application 13 performs no functionality once the machine state is set by the security application 13. In this regard, the security application 13 merely sets the machine state of the computer system 12 such that the operating system 16, via normal operation, enforces the rule selected for enforcement.

Furthermore, the foregoing example is presented for illustrative purposes. The enforceability of various other rules may be controlled by controlling the machine state according to various other techniques. Such techniques are well-known in the art and will not be described in detail herein.

Figure 2:
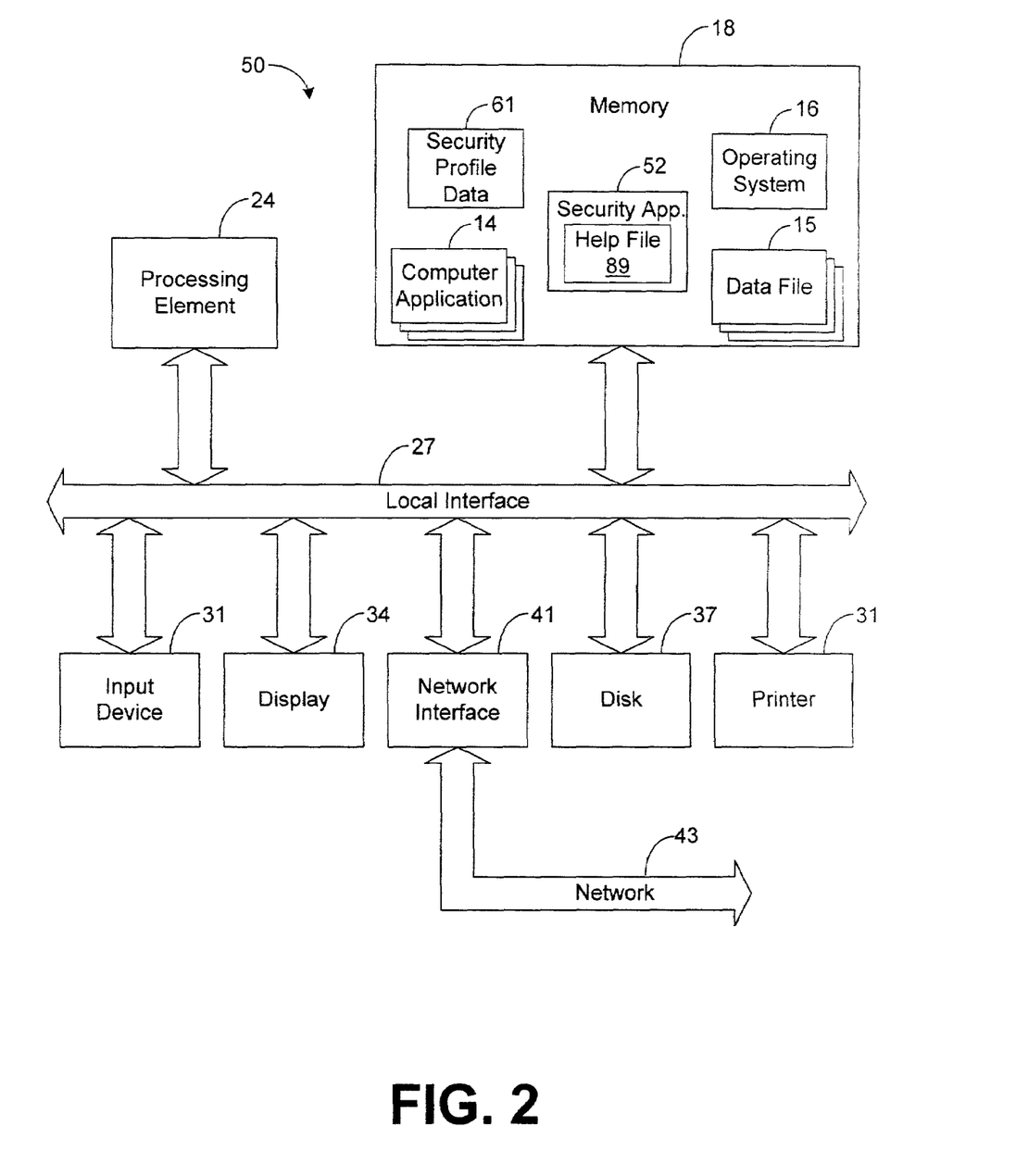
FIG. 2 is a block diagram illustrating a computer system employing a security application in accordance with the principles of the present invention.

FIG. 2 depicts a computer system 50 that may be employed to implement the present invention. Similar to conventional computer system 12, system 50 includes one or more computer applications 14 and data files 15 stored in memory 18 along with an operating system 16. The operating system 16 via conventional techniques controls the operation and the resources of the system 16 and, in particular, controls the interfacing of instructions with a processing element 24.

The system 50 also includes a security application 52 configured in accordance with the principles of the present invention. The security application 52 can be implemented in software, hardware, or a combination thereof. In the preferred embodiment, as illustrated by way of example in FIG. 2, the security application 52 of the present invention along with its associated methodology is implemented in software and stored in memory 18.

Note that the security application 52, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the security application 52 may be magnetically stored and transported on a conventional portable computer diskette.

As in conventional computer system 12, the processing element 24 of the system 50 may communicate to and drive the other elements within the system 50 via a local interface 27, which can include one or more buses. Furthermore, an input device 31, for example, a keyboard or a mouse, can be used to input data from a user of the system 50, and an output device 34, such as a screen display or a printer, can be used to output data to the user. A disk storage mechanism 37 can be connected to the local interface 27 to transfer data to and from a nonvolatile disk (e.g., magnetic, optical, etc.). The system 50 can be connected to a network interface 41 that allows the system 50 to exchange data with a network 43.

Similar to conventional security application 13, the security application 52 includes data that defines a list of security rules for preventing access and/or modification of certain applications 14, data files 15, and/or other resources within the computer system 12. The list of rules defined by the security application 52 may be the same list of rules defined by conventional security application 13. When invoked, the security application 52 provides a list of options, via output device 34, to the user of the system 50. The user that initially invokes the security application 52 is considered to be a system administrator.

To enable selection of a security profile, the security application 52 displays, via output device 34, the list of security rules defined by the security application 52. From this list, the system administrator, via input device 31, selects which rules should be enforced and which rules should not be enforced upon activation of the security profile being defined by the system administrator. In other words, the system administrator may select which of the displayed rules should be included in the security profile. Techniques that may be employed in the selection of the foregoing rules will be described in further detail hereinafter.

After each desired security rule has been selected, the system administrator inputs, via input device 31, an activation request for activating the security profile being defined by the system administrator. In response, the security application 52 modifies the machine state of the computer system 50 such that the security rules selected by the system administrator are enforced by the computer system 50 (e.g., by operating system 16) during any subsequent operation until the security profile is later changed. The techniques used to update the machine state should be similar to the techniques employed by conventional security application 13 in updating the machine state of conventional system 12.

Note that to facilitate the selection of security rules by the system administrator, the security application 52 preferably enables the system administrator to select a default level of security protection. For example, in one embodiment, the system administrator is given the option to select one of four default levels of security protection: "blank protection," "low protection," "medium protection," and "high protection." Note that other default levels of protection may be implemented in other embodiments.

When the default level of "blank protection" is selected by the system administrator, each security rule is disabled by default. As used herein, a rule is "disabled" by indicating that the rule is not selected for enforcement by the system 50, and a rule is "enabled" by indicating that the rule is selected for enforcement by the system 50. Thus, to define a desired level of protection after selecting the default level of "blank protection," the system administrator manually selects, via input device 31, each security rule that is to be enforced upon activation of the security profile being defined by the system administrator. In other words, the system administrator manually controls which rules are enabled and, therefore, enforced upon activation of the security profile. If a security rule is not manually enabled (i.e., selected for enforcement) by the system administrator, then the rule remains disabled by default and is not enforced upon activation of the security profile. Thus, when the default level of "blank protection" is selected by the system administrator, the system administrator defines the security profile through techniques similar to those used to define the security profile of conventional system 12.

When the default level of "low protection" is selected by the system administrator, certain rules are enabled by default, and the remainder of the rules are disabled by default. In this regard, the programmer of the security application 50 attempts to guess which rules a system administrator would want enabled if the system administrator only wants a low level of security for a computer system. The programmer then programs the security application 52 such that only the rules that provide security without significantly affecting compatibility, in the opinion of the programmer, are enabled by default. If the system administrator is aware of certain security rules that he or she would like enabled or disabled, then the system administrator may manually enable or disable these rules via input device 31. The rules that are not manually enabled or disabled by the system administrator maintain their default status. Thus, when the system administrator inputs the activation request, the only security rules included in the security profile and, therefore, enforced by the system 50 are the security rules: (1) manually enabled by the system administrator or (2) enabled by default and not manually disabled by the system administrator. As a result, it is not necessary for the system administrator to analyze each security rule to determine whether or not he or she would like the rule enabled or disabled. Instead, the system administrator may choose to manually control the status of security rules of particular interest to the system administrator and to rely on the selections of the programmer for the rules that the system administrator is either less interested in or less familiar with.

The remaining levels of protection (i.e., "medium protection" and "high protection") are similar to the level of "low protection" in that the programmer enables certain rules by default and disables certain rules by default. However, the programmer should program the security application 52 such that a different set of rules is enabled by default for each level of protection. For example, the programmer preferably enables by default more rules for "medium protection" than for "low protection," and the programmer preferably enables by default more rules for "high protection" than for "medium protection." Thus, as described above for "low protection," only security rules that do not significantly impact compatibility may be enabled by default. However, for "medium protection," the programmer may assume that the system administrator is more concerned with security and, therefore, more security rules that significantly impact compatibility may be enabled by default. The programmer may further assume that the system administrator in selecting "high protection" may be particularly concerned with security and, therefore, each security rule that significantly improves security may be enabled by default regardless of the rule's impact to compatibility. It is possible for each rule to be enabled by default when the system administrator selects the default level of "high protection." In any event, for each of the latter three default levels of protection (i.e., "low," "medium," and "high"), there is a different set of rules that are enabled by default.

Figure 3:
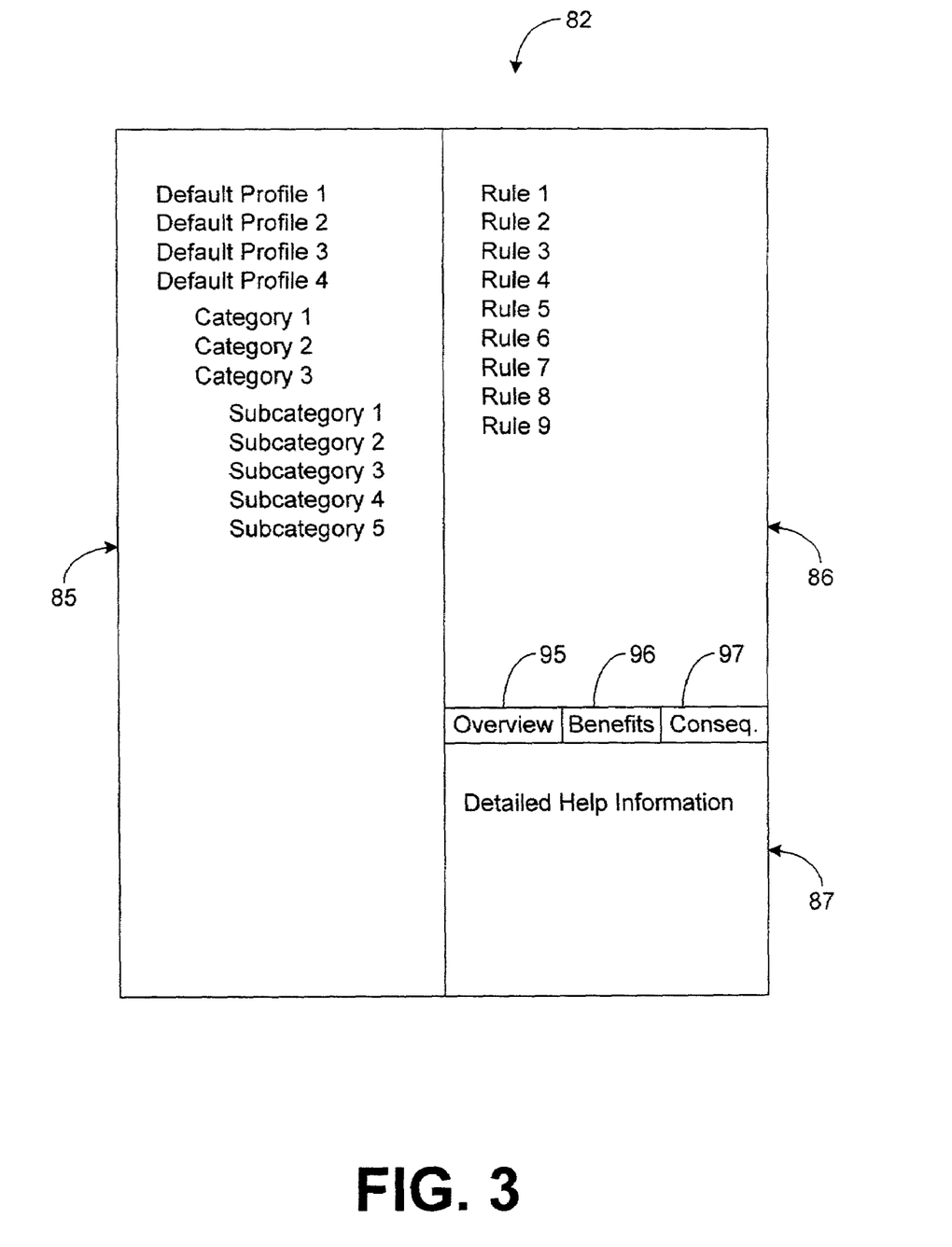
FIG. 3 is a block diagram illustrating an exemplary window that may be displayed by the security application depicted in FIG. 2 in order to show a list of security application rules defined by the security application.

There are a variety of techniques that may be employed to allow the system administrator to select a default profile level and then to manually enable or disable different rules within the selected default security profile. FIG. 3 depicts an exemplary window 82 for displaying information to the system administrator in allowing the system administrator to view which security rules may be selected for enabling or disabling. This window 82 is preferably defined by data from security application 52 and may be displayed on a display screen of output device 34. During operation, the security application 52 transmits such data to output device 34, which displays the window 82 based on the data transmitted from security application 52.

The window 82 of FIG. 3 depicts three regions 85–87 that each display different types of information. Each of the regions 85–87 may be a sub-window of window 82. As will be described in more detail hereafter, region 85 displays categories and possibly subcategories of security rules. The system administrator, via input device 31, may select one of the displayed categories and/or subcategories, and in response, each security rule associated with the selected category and/or subcategory is displayed in region 86. The information displayed in region 86 not only identifies each rule associated with the selected category and/or subcategory but also indicates whether or not the rule is presently enabled or disabled. The system administrator may provide an input for manually changing the enabled/disabled status of any rule. Upon such occurrence, the region 86 should be updated to indicate that the status of the rule has been so changed. Further, if desired, the system administrator may obtain more information pertaining to any rule listed in region 86 by selecting, via input device 31, any of the rules displayed in region 86. In response, detailed information pertaining to the selected rule is automatically displayed in region 87. The system administrator may utilize the information displayed in region 87 to find more information about the ramifications of enabling or disabling the selected rule, thereby enabling the system administrator to make better decisions in manually enabling and disabling the security rules.

As shown by region 85 of FIG. 3, the list of security rules defined by the security application 52 are preferably categorized according to the classes of "default profiles," "categories," and "subcategories." The "default profiles" class pertains to the default levels of security that may be selected by the system administrator. Thus, in the preferred embodiment, as previously described hereinabove, there are four types of default profiles: (1) blank protection, (2) low protection, (3) medium protection, and (4) high protection Each of these default profiles, which are respectively represented as "default profile 1" through "default profile 4" in FIG. 3, is preferably listed in region 85.

Each security rule listed by the security application 52 is grouped into one or more categories. Any logical grouping of the rules may be used to define the categories. In the preferred embodiment, each "category" pertains to a different one of the computer applications 14. In this regard, each security rule that, when enforced, potentially affects the operation of a particular application 14 is preferably grouped into the category that pertains to the particular application 14. A listing of the categories may appear in window 82. In the preferred embodiment, a listing of the categories appears in region 85 along with the listing of the default profiles, as shown by FIG. 3.

A user may select one of the categories via input device 31, and the security rules grouped into the selected category may be displayed in region 86. Therefore, if a user desires to change the security configuration pertaining to a particular application 14, the user does not have to search through the rules that pertain only to other applications 14. In this regard, the user may select the category of interest causing the security application 52 to display in region 86 only rules that pertain to the application 14 of interest. The user may then search through the list of rules displayed in region 86 until the user discovers and manually sets the status of the displayed rules as desired. Since the rules that only pertain to other applications are not displayed in region 86, it should be easier for the user to locate the particular rules of interest within region 86.

To further help the user in finding rules of interest, the rules within a particular category may be grouped into various "subcategories." As shown by FIG. 3, a listing of these subcategories may be displayed within window 82. In the preferred embodiment, the list of subcategories is displayed within region 85 along with the list of profile levels and categories.

Any logical ordering of the rules within the particular category may be employed to group the rules into subcategories. For example, each security rule pertaining to the restriction of access of a particular application 14 may be grouped into a first subcategory, and each security rule pertaining to how the settings of the particular application may be changed may be grouped into another subcategory. Note that the foregoing subcategories are described for illustrative purposes only and that other types of subcategories may be defined, if desired.

After selecting a particular category, the user may then select one of the subcategories that is associated with the selected category. Further, rules grouped into the selected subcategory may be displayed in region 86 in response to the selection of the subcategory. In the preferred embodiment, a security rule is displayed within region 86 only if it is grouped into the presently selected category and the presently selected subcategory, although other rules may be displayed within region 86, if desired. As a result, the number of displayed rules that a user searches through in locating a particular rule of interest is further reduced, thereby making it easier for the user to locate the particular rule of interest.

Once a user has identified a rule of interest within region 86, the user may select the rule via input device 31 in order to obtain more information about the rule. In this regard, the security application 52 preferably includes data that defines detailed help information about each rule defined by the security application 52. Although not necessary for implementation of the present invention, this information may be stored in a separate help file 89, as shown by FIG. 2, dedicated to providing help information within region 87. When one of the rules is selected in order to obtain more information about the rule, the security application 52 in response transmits to the output device 34 portions of the help data that define information pertaining to the selected rule. The output device 34 then displays this help data in region 87, as shown by FIG. 3. Therefore, the user can analyze region 87 in order to obtain detailed information describing a selected rule.

As shown by FIG. 3, the region 87 preferably includes selectable icons 95–97, such as tabs, buttons, etc., that enable the user to navigate through the detailed help information pertaining to the selected rule. More specifically, the security application 52 is designed to display different help information within region 87 based on which selectable icon 95–97 has been selected by the user.

As an example, the region 87 shown by FIG. 3 includes three selectable icons: an overview icon 95, a benefits icon 96, and a consequences icon 97. When the user selects the overview icon 95, the security application 52 may be configured to display help data within region 87 describing general information about the presently selected rule. When the user selects the benefits icon 96, the security application 52 may be configured to display help data within region 87 describing the benefits associated with enforcing the presently selected rule, and when the user selects the consequences icon 97, the security application 52 may be configured to display help data within region 87 describing the consequences associated with enforcing the presently selected rule.

Note that the security application 52 can be configured to display one of the categories of help information by default upon selection of a particular rule. For example, when the user selects one of the rules within region 86, the security application 52 may be configured to display the same help data that is displayed when the user selects the overview icon 95. Once the user selects a different icon 96 or 97, then the security application 52 may be configured to display different help data within region 87 according to the techniques described above. Note that other categories of help data may be defined and used by the security application 52.

It should be noted that different computer systems 50 may be configured differently and, therefore, may include different computer applications 14. In order for the security application 52 to be compatible with different computer systems 50, the security application may define categories of rules that will not be used by all computer systems 50. For example, the security application 52 may define a category of rules pertaining to a particular computer application 14, such as Microsoft Outlook, for example. This category of rules may be beneficial for a computer system 50 that includes the particular application 14. However, if a computer system 50 does not include the particular application 14, then whether or not the rules of the foregoing category are enabled should not affect the operation of the system 50. Indeed, it may be desirable to refrain from displaying, in window 82, this category of rules for computer systems 50 that do not include the particular application 14 in order to make the operation of the security application 52 more simple and user friendly.

Thus, when the security application 52 is invoked, the security application 52 is preferably configured to discover which applications 14 are presently included in the system 50 (e.g., stored in memory 18). This may be accomplished by appropriately querying the operating system 16, which should be familiar with each application 14 installed in the system 50. If a category of rules pertains to an application 14 that is not included in the system 50, then the security application 52 is preferably designed to refrain from displaying the category of rules in window 82. Therefore, the region 85 should list fewer categories of rules making it easier for the user to identify and locate within region 85 a particular category of interest to the user.

OPERATION

The preferred use and operation of the computer system 50 and associated methodology are described hereafter. In the example described hereafter, assume that the computer system 50 includes three applications 14 stored in memory: Microsoft Word, Microsoft Outlook, and Microsoft BackOffice. Further assume that the system administrator, in defining the computer system's security profile, would like to select the default level of medium protection. Also assume that the system administrator would like to ensure that a particular set of the security rules is not enforced upon activation of the security profile. In this regard, assume that the system administrator would like to ensure that any user can access any Word document stored by the computer system 50. Thus, the system administrator would like to manually control the rules pertaining to the accessing of Word files.

Figure 4:
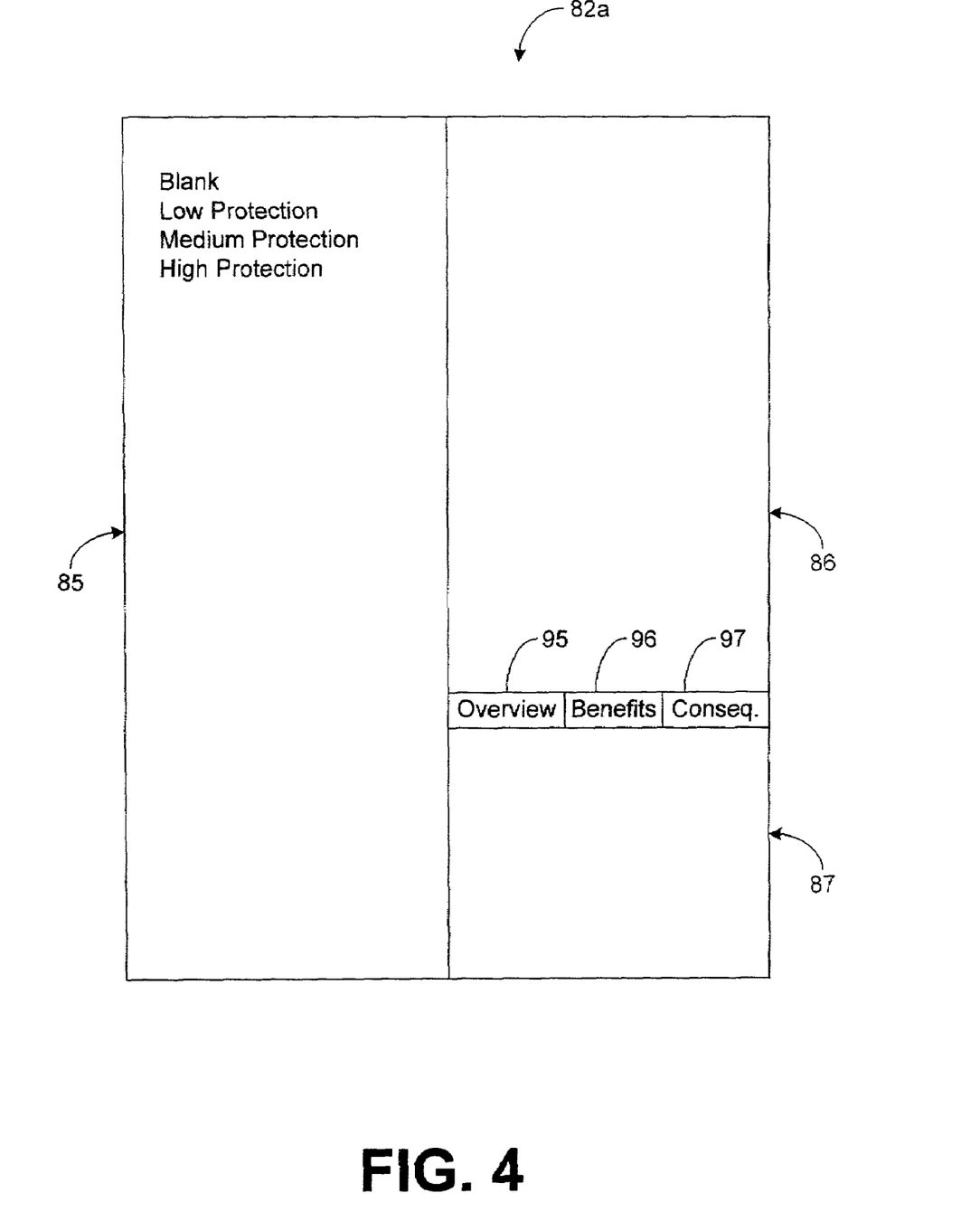
FIG. 4 is a block diagram illustrating an exemplary window that may be displayed by the security application depicted in FIG. 2 in order to enable a system administrator to select a default profile level.

In order to activate the desired security profile, the system administrator first invokes the security application 52. Upon invocation, the security application 52 displays window 82a (FIG. 4), which lists each of the default profile levels in region 85. The system administrator, via input device 31, selects the desired default level listed in window 82a. In the present example, the system administrator desires and, therefore, selects the default level of medium protection.

Figure 5:
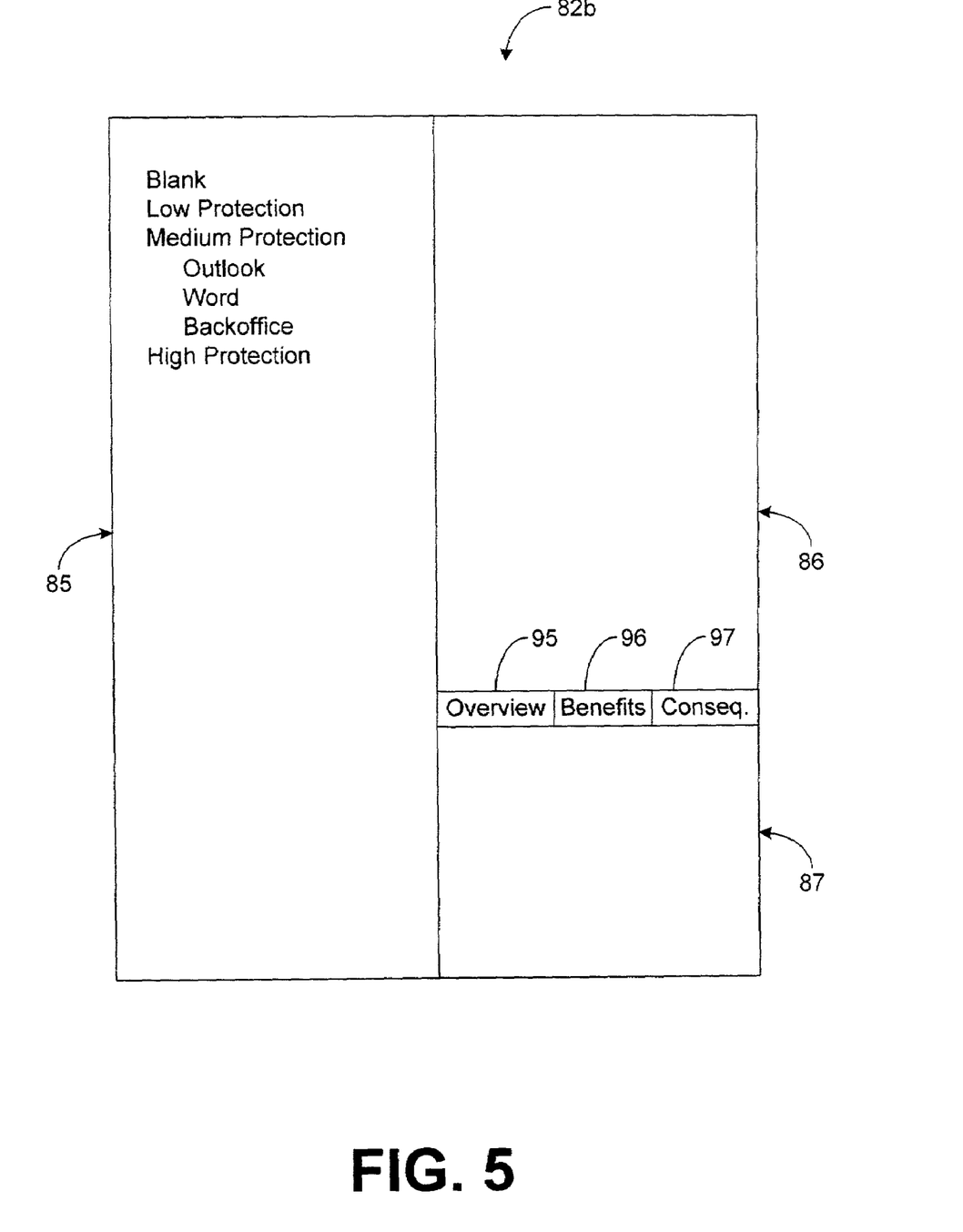
FIG. 5 is a block diagram illustrating an exemplary window that may be displayed by the security application depicted in FIG. 2 once the system administrator has selected a default profile level.

Upon selection of the medium default level, the security application 52 updates the window 82a in order to display the window 82b shown in FIG. 5. More specifically, the security application 52 displays each category of rules. The system administrator then selects the category associated with the particular set of rules that the system administrator would like to manually control. For example, as described hereinabove, each category in the preferred embodiment is associated with a respective one of the applications 14 stored in memory 18. Thus, the system administrator preferably selects the category associated with the application 14 affected by enforcement of the particular rules that the user would like to manually control. In the present example, the system administrator selects the category associated with Microsoft Word.

Figure 6:
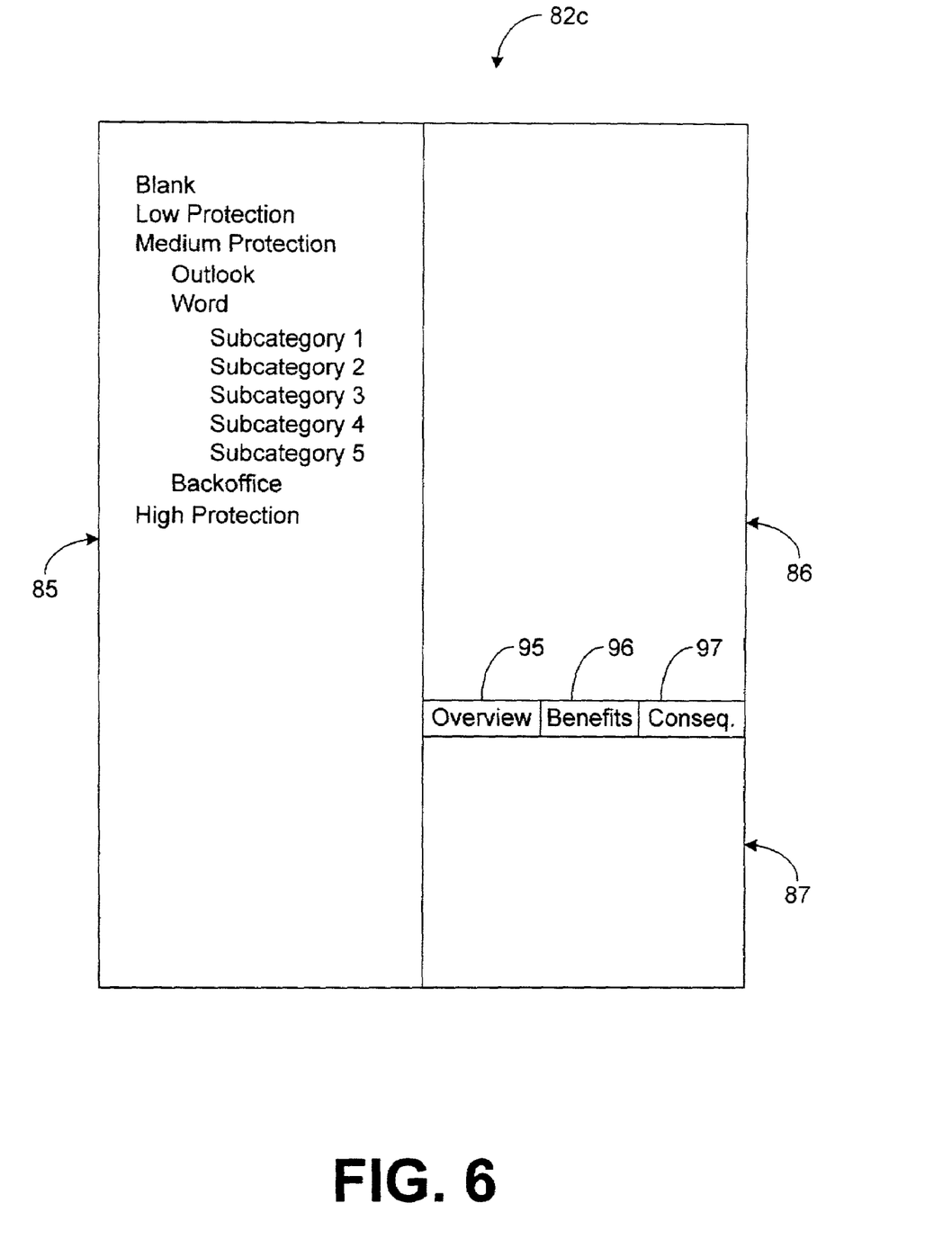
FIG. 6 is a block diagram illustrating an exemplary window that may be displayed by the security application depicted in FIG. 2 once the system administrator has selected a category.

In response, the security application 52 updates the window 82b in order to display the window 82c shown in FIG. 6. More specifically, the security application 52 displays each subcategory of rules within the category just selected by the system administrator. The system administrator then selects the subcategory associated with the particular rules that the system administrator would like to manually control. In other words, the system administrator selects the subcategory that includes the particular rules to be manually controlled by the system administrator. For example, the subcategories of the Microsoft Word category may be defined such that there is a subcategory pertaining to the accessibility of Word documents. Since the system admin istrator is interested in manually controlling the rules within this subcategory, the system administrator should select this category via input device 31.

Figure 7:
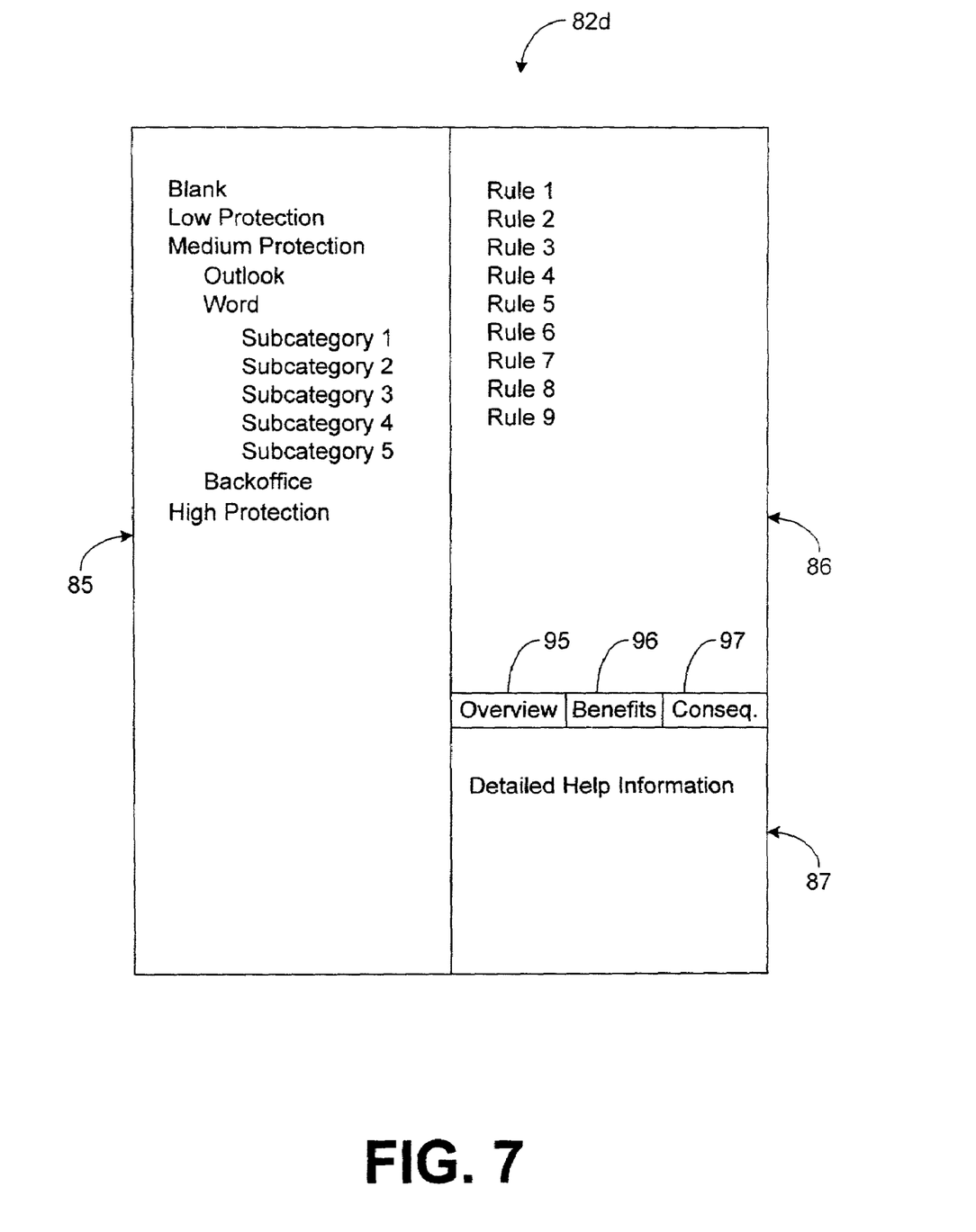
FIG. 7 is a block diagram illustrating an exemplary window that may be displayed by the security application depicted in FIG. 2 once the system administrator has selected a subcategory.

In response, the security application 52 updates the window 82c in order to display the window 82d shown in FIG. 7. More specifically, the security application 52 displays the rules within the selected subcategory. Each of the displayed rules within region 86 of window 82d should indicate whether or not the rule is presently enabled or disabled. A variety of conventional techniques may be utilized to achieve this functionality. For example, each rule displayed within region 86 may be associated with a first particular type of icon, if the rule is enabled, and associated with a different type of icon, if the rule is disabled. Until the system administrator begins to manually change the status of the rules, the rules should be enabled and/or disabled according to the default level of protection previously selected by the system administrator.

As previously described, the system administrator may select any of the displayed rules in order to display more detailed information pertaining to the selected rule within region 87. When the system administrator locates a particular rule of interest to the system administrator, the system administrator may also provide an input in order to change the status of the rule (i.e., enable or disable) as desired.

Once the status of the rules are set as desired by the system administrator, the system administrator may provide an input to activate the security profile that has been selected by the system administrator. In response, the security application 52 changes the machine state of the computer system 50 such that the rules selected for enforcement (i.e., enabled) at the time of activation are enforced by the computer system 50.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, the following is claimed:

1. A computer system, comprising:
a display device having a screen for displaying images; and
a security application defining a list of security rules for locking down resources of said computer system, said security application configured to categorize said rules into a plurality of categories and to display at least one of said categories on said screen, said security application configured to determine which of said rules are associated with said one category in response to a selection of said one category by a user of said computer system, said security application configured to display on said screen each of said rules associated with said one category in response to said selection, said security application further configured to allow said user to enable ones of said rules and to cause said computer system to enforce said enabled ones of said rules by modifying a machine state of said computer system, wherein different ones of said categories respectively pertain to different ones of a plurality of applications and wherein said rules are categorized such that said one category is assigned only to ones of said rules that affect a particular application pertaining to said one category.

2. The computer system of claim 1, wherein said computer system further comprises memory storing various computer applications, and wherein said security application is further configured to determine which computer applications are stored in said memory and to display said categories based on a determination by said security application as to which computer applications are stored in said memory.

3. The system of claim 1, wherein said one category is displayed on said screen by said security application in response to a selection of another category by said user.

4. The system of claim 1, wherein said one category is a sub-category of another of said categories.

5. The system of claim 1, wherein each of said rules is assigned to a respective one of said categories based on whether said each rule controls access to an application pertaining to said respective one category.

6. The system of claim 1, wherein each of said categories is assigned only to ones of said security rules that affect a respective one of said applications pertaining to said each category.

7. The system of claim 1, wherein said security application, in response to a selection of one of said rules, is configured to display help information pertaining to said one rule.

8. A system for locking down resources of computer systems, comprising:
means for defining a list of security rules for locking down resources of a computer system;
means for categorizing said rules into a plurality of categories;
means for displaying at least one of said categories;
means for determining, in response to a selection of said one category, which of said rules is associated with said one category;
means for displaying each of said rules determined to be associated with said one category;
means for enabling ones of said rules based on user inputs; and
means for enforcing each of said enabled rules,
wherein different ones of said categories respectively pertain to different ones of a plurality of applications and wherein said categorizing means is configured to assign said one category only to ones of said rules that affect a particular application pertaining to said one category.

9. The system of claim 8, further comprising:
means for storing various computer applications;
means for identifying which computer applications are stored in said storing means; and
means for displaying said categories based on which computer applications are identified by said identifying means.

10. The system of claim 8, further comprising:
means for selecting another of said categories; and
means for displaying said one category in response to a selection by said selecting means.

11. The system of claim 8, wherein said one category is a sub-category of another of said categories.

12. A method for locking down resources of computer systems, comprising:
defining a list of security rules for locking down resources of a computer system;

categorizing said rules into a plurality of categories, wherein different ones of the plurality of categories pertain to different ones of a plurality of applications;

displaying at least one of said categories;

determining, in response to a selection of said one category, which of said rules is associated with said one category;

displaying each of said rules determined to be associated with said one category;

enabling ones of said rules; and enforcing each of said enabled rules based on said enabling, wherein said categorizing comprises assigning said one category only to ones of said rules that affect a particular application pertaining to said one category.

13. The method of claim 12, wherein said computer system has memory and said method further comprises:

storing various computer applications in said memory;

determining which computer applications are stored in said memory; and displaying said categories based on said determining which computer applications are stored in said memory.

14. The method of claim 12, further comprising:

selecting another of said categories; and displaying said one category in response to said selecting.

15. The method of claim 12, wherein said one category is a sub-category of another of said categories.

16. The method of claim 12, wherein said categorizing comprises assigning each of said rules to a respective one of said categories in response to a determination that said each rule controls access to an application pertaining to said respective one category.

17. The method of claim 12, wherein each of said categories pertains to only a respective one of said applications.

18. The method of claim 12, further comprising:

selecting one of said rules; and displaying help information pertaining to said one rule in response to said selecting.

19. The method of claim 12, further comprising making said selection in response to a determination that said one category pertains to said particular application.

* * * * *